United States Patent
Ihm et al.

(10) Patent No.: US 8,374,160 B2
(45) Date of Patent: Feb. 12, 2013

(54) METHOD OF TRANSMITTING AND RECEIVING FEEDBACK INFORMATION AND MOBILE STATION/BASE STATION APPARATUS THEREFOR

(75) Inventors: Bin Chul Ihm, Gyeonggi-do (KR); Su Nam Kim, Gyeonggi-do (KR); Ja Ho Koo, Gyeonggi-do (KR); Dong Guk Lim, Gyeonggi-do (KR); Wook Bong Lee, Gyeonggi-do (KR); Jae Wan Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 304 days.

(21) Appl. No.: 12/709,364

(22) Filed: Feb. 19, 2010

(65) Prior Publication Data
US 2010/0208610 A1    Aug. 19, 2010

Related U.S. Application Data

(60) Provisional application No. 61/153,651, filed on Feb. 19, 2009.

(30) Foreign Application Priority Data

Feb. 19, 2010    (KR) .................. 10-2010-0015196

(51) Int. Cl.
*H04J 3/00*    (2006.01)
(52) U.S. Cl. ......... 370/338; 370/346; 370/449; 445/447
(58) Field of Classification Search .............. 370/252, 370/253, 328–338, 346, 449, 468; 455/446–447
See application file for complete search history.

(56) References Cited

U.S. PATENT DOCUMENTS

| 2008/0214198 A1* | 9/2008 | Chen et al. ............... 370/329 |
| 2009/0047971 A1* | 2/2009 | Fu ............................. 455/450 |

FOREIGN PATENT DOCUMENTS

| KR | 10-2008-0114518 | 12/2008 |
| WO | 2007090115 | 8/2007 |
| WO | 2007108769 | 9/2007 |

OTHER PUBLICATIONS

J. H. Yeom et al., "Mitigation of Inter-Cell Interference in the WiMAX System," IEEE Mobile WiMAX Symposium, pp. 26-31, Mar. 2007.

* cited by examiner

*Primary Examiner* — Pao Sinkantarakorn
(74) *Attorney, Agent, or Firm* — Lee, Hong, Degerman, Kang & Waimey

(57) ABSTRACT

A method of transmitting and receiving feedback information in a multi-cell based wireless communication system using FFR, a mobile station apparatus therefore and a base station apparatus therefore are disclosed. A mobile station is able to obtain FFR configuration information including configuration information on at least one frequency partition to which a corresponding FFR is applied per cell ID. And, the mobile station is able to transmit PMI information to a serving base station using the obtained FFR configuration information. In this case, the PMI information is specifically restricted or recommended by the mobile station among PMIs (precoding matrix indexes) used by at least one neighbor cell in an allocated specific frequency partition.

24 Claims, 4 Drawing Sheets

METHOD OF TRANSMITTING AND RECEIVING FEEDBACK INFORMATION AND MOBILE STATION/BASE STATION APPARATUS THEREFOR

CROSS-REFERENCE TO RELATED APPLICATIONS

Pursuant to 35 U.S.C. 119(e), this application claims the benefit of Provisional Application No. 61/153,651, filed on Feb. 19, 2009, and pursuant to 35 U.S.C. 119(a), this application also claims the benefit of earlier filing date and right of priority to Korean Application No. 10-2010-0015196, filed on Feb. 19, 2010, the contents of which are all hereby incorporated by reference herein in their entirety.

FIELD OF THE INVENTION

The present invention relates to a method of transmitting and receiving feedback information, a mobile station apparatus therefor and a base station apparatus therefor.

DESCRIPTION OF THE RELATED ART

Generally, in multi-carrier type orthogonal frequency division multiple access (hereinafter abbreviated PFDMA) system, resource allocation is performed by a subchannel unit constructed with subcarriers. In particular, entire subcarriers are divided and shared with a plurality of users. Through this, it is able to secure multi-user diversity gain in frequency domain. In such an PFDMA based broadband mobile internet access system as WiBro, the same frequency is reused by every cell. And, it is able to maximize the throughput in a manner of applying AMC (adaptive modulation and coding) according to reception signal strength and inter-neighbor cell interference generated from reusing the same frequency.

Yet, if case of a system having a frequency reuse 1, the throughput is inevitably reduced due to severe inter-neighbor cell interference on a cell or sector boundary. Moreover, a service outage situation takes place. As a method of enhancing performance on a cell boundary, a method of mitigating the same channel interference between neighbor cells in a manner of orthogonally dividing a whole subcarrier into a plurality of frequency partitions and not using some of the partitions for each cell by arranging the frequency partitions appropriately or using the partitions at low power level is called a fractional frequency reuse (hereinafter abbreviated FFR).

This fractional frequency reuse technique (hereinafter abbreviated FFR) is provided to enhance communication performance of a cell boundary user in multi-cell based environment. In general, a cell or sector includes a plurality of frequency partitions on a whole bandwidth. And, each of the frequency partitions can be allocated to a corresponding mobile station on specific condition.

In order to apply FFR in a real system, it is able to determine which of the frequency partitions (or bands) will be used with reference to a frequency pattern provided to each cell based on location information of each mobile station. Since a signal to interference ratio continuously varies on the same band due to fading and mobility of mobile station in a real communication environment, it is able to dynamically reflect the signal to interference ratio to determine which of frequency partitions will be used among the bands assigned to the respective cells.

However, according to a related art, in case of performing PMI coordination, it may cause a problem that average cell throughput is reduced. Moreover, a solution for this problem has not been provided so far.

SUMMARY

Accordingly, the present invention is directed to a method of transmitting and receiving feedback information and mobile/base station apparatus therefore that substantially obviate one or more of the problems due to limitations and disadvantages of the related art.

An object of the present invention is to provide a method of transmitting and receiving feedback information.

Another object of the present invention is to provide a mobile station apparatus for transmitting feedback information.

A further object of the present invention is to provide a base station apparatus for receiving feedback information.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, at a mobile station of a multi-cell based wireless communication system using FFR (fractional frequency reuse), a method of transmitting feedback information includes receiving a target resource unit information for feedback and inter-cell interference coordination type information indicating operation type of the inter-cell interference coordination from a serving base station (BS); and transmitting feedback information having a type corresponding to the inter-cell interference coordination type for resource unit corresponding to the target resource unit information to the serving BS. In this case, the target resource unit information may indicate any one of whole bandwidth, a frequency partition with index 0, and power boosted frequency partition. Also, the inter-cell interference coordination type information indicates reporting of PMI (Precoding Matrix Index) restriction information or PMI recommendation information for one or more neighbor cell.

A method of transmitting feedback information according to the present invention includes the steps of obtaining FFR configuration information including configuration information on at least one frequency partition to which a corresponding FFR is applied per cell ID and transmitting PMI information to a serving base station using the obtained FFR configuration information. In this case, the PMI information is specifically restricted or recommended by the mobile station among PMIs (precoding matrix indexes) used by at least one neighbor cell in an allocated specific frequency partition.

To further achieve these and other advantages and in accordance with the purpose of the present invention, in a multi-cell based wireless communication system using FFR (fractional frequency reuse), a mobile station apparatus includes a receiving unit for receiving a target resource unit information for feedback and inter-cell interference coordination type information indicating operation type of the inter-cell interference coordination from a serving base station (BS); and a transmitting unit for transmitting feedback information in a type corresponding to the inter-cell interference coordination type for resource unit corresponding to the target resource unit information to the serving BS.

Also, a mobile station apparatus for transmitting feedback information includes a unit for obtaining FFR configuration information including configuration information on at least one frequency partition to which a corresponding FFR is applied per cell ID and a transmitting unit for transmitting PMI information to a serving base station using the obtained FFR configuration information. In this case, the PMI information is specifically restricted or recommended by the mobile station among PMIs (precoding matrix indexes) used by at least one neighbor cell in an allocated specific frequency partition.

To further achieve these and other advantages and in accordance with the purpose of the present invention, at a base station of a multi-cell based wireless communication system using FFR (fractional frequency reuse), a method of receiving feedback information includes transmitting a target resource unit information for feedback and inter-cell interference coordination type information indicating operation type of the inter-cell interference coordination to a mobile station (MS); and receiving feedback information having a type corresponding to the inter-cell interference coordination type for resource unit corresponding to the target resource unit information from the MS.

Also, a method of receiving feedback information includes the steps of receiving PMI information from a specific mobile station, the PMI information specifically restricted or recommended among PMIs (precoding matrix indexes) used by at least one neighbor cell in an allocated specific frequency partition and transmitting the received PMI information to at least one neighbor cell.

To further achieve these and other advantages and in accordance with the purpose of the present invention, in a multi-cell based wireless communication system using FFR (fractional frequency reuse), a base station apparatus for receiving feedback information includes a transmitting unit for transmitting a target resource unit information for feedback and inter-cell interference coordination type information indicating operation type of the inter-cell interference coordination to a mobile station (MS); and a receiving unit for receiving feedback information having a type corresponding to the inter-cell interference coordination type for resource unit corresponding to the target resource unit information from the MS.

Also, a base station apparatus for receiving feedback information includes a receiving unit for receiving PMI information from a specific mobile station, the PMI information specifically restricted or recommended among PMIs (precoding matrix indexes) used by at least one neighbor cell in an allocated specific frequency partition and a transmitting unit for transmitting the received PMI information to at least one neighbor cell.

It is to be understood that both the foregoing general description and the following detailed description are exemplary and explanatory and are intended to provide further explanation of the invention as claimed.

Accordingly, the present invention provides the following effects and/or advantages.

First of all, by feedback transmission by a mobile station according to the present invention, if PMI coordination is performed, average cell throughput can be considerably enhanced as well as throughput of a cell boundary user. In particular, communication performance of a mobile station can be considerably enhanced.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Figure 1:
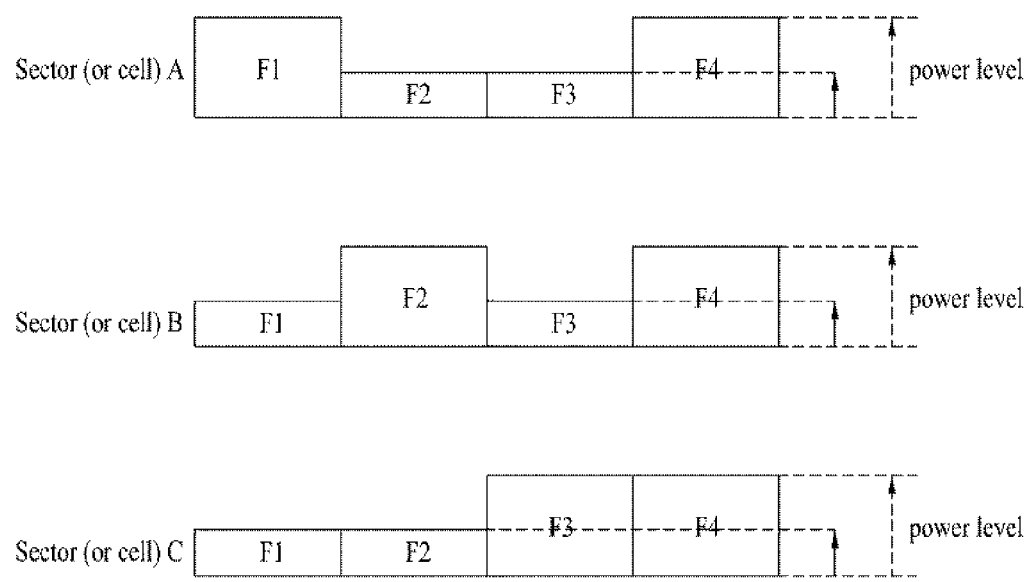
FIG. 1 is a diagram for an example of FFR.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection.

Besides, in the following description, assume that a terminal is a common name of such a mobile or fixed user stage device as a user equipment (UE), a mobile station (MS) and the like and that a base station is a common name of such a random node of a network stage communicating with a terminal as a node B, eNode B, a base station and the like.

In a mobile communication system, a user equipment can receive information in downlink from a base station. The user equipment is also able to transmit information in uplink. The information transmitted/received by the user equipment includes data and various kinds of control information. And, various physical channels exist according to types and usages of the information transmitted or received by the user equipment.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document can be supported by the standard documents.

In the following description, specific terminologies used for embodiments of the present invention are provided to help the understanding of the present invention. And, the use of the specific terminology can be modified into another form within the scope of the technical idea of the present invention.

According to the present invention, if a terminology called a base station is used as a regional concept, it can be called a cell or sector. And, a user equipment can be differently named such a terminology as a user and the like. Moreover, a serving base station (or a cell) can include a base station (or a cell) that provides a user equipment with a major service.

FIG. 1 is a diagram for an example of FFR.

Referring to FIG. 1, one cell (or sector) can include 4 frequency partitions F1 to F4 on a whole bandwidth in general. The 4 frequency partitions can be classified into frequency reuse 3 regions F1 to F3 and a frequency reuse 1 region F4.

Each cell allocates an inner (or central) user within a cell to the region F4 of the frequency reuse 1 in general. This is because the inner user is less affected by interference from another cell than a cell boundary user in general. Therefore, each cell is able to transmit a signal to a mobile station at high power level to inner users for which a resource is allocated to the region F4 of the frequency reuse 1.

Moreover, each cell is able to allocate the regions F1 to F3 of the frequency reuse 3 to a mobile station located on a cell boundary and a mobile station located within the cell. In doing so, each cell is able to allocate different frequency partitions among the regions of the frequency reuse 3 for the mobile station located on the cell boundary. For instance, a cell A is able to allocate the region F1 among the regions of the frequency reuse 3 to the mobile station located on the cell boundary that can be more affected by the inter-cell interference. If so, a cell B and a cell C allocate the region F1 to mobile stations located within the cells (or at centers of the cells) and are then able to transmit signals at low power level to the mobile stations. Therefore, the mobile station located on a boundary of the cell A receives a less interference from another cell and is then able to receive a downlink signal from the cell A more efficiently.

Similarly, the cell B is able to allocate the region F2 to a user located on a cell boundary that can be more affected by the inter-cell interference. If so, the cell A and the cell B allocate the region F2 to the users located within the cell A and the cell C (or at the centers of the cell A and the cell C) and are then able to transmit signals to the corresponding users at low power level. Therefore, the mobile station located on a boundary of the cell B receives a less interference from another cell and is then able to receive a downlink signal from the cell B more efficiently.

Moreover, the cell C is able to allocate the region F3 to a user located on a cell boundary that can be more affected by the inter-cell interference. If so, the cell A and the cell C allocate the region F3 to the users located within the cell A and the cell B (or at the centers of the cell A and the cell B) and are then able to transmit signals to the corresponding users at low power level. Therefore, the mobile station located on a boundary of the cell C receives a less interference from another cell and is then able to receive a downlink signal from the cell C more efficiently.

For example of the cell A, in case that the inner users of the cell A are allocated to the region F2 and the region F3 among the regions of the frequency reuse 3, it is able to allocate a power level relatively smaller than that of the region F1, to which a cell boundary user is allocated, to the inner user. Therefore, the inner users allocated to the regions F2 and F3 can receive signals from a serving cell (i.e., the cell A) at the power level relatively lower than that of the cell boundary mobile station.

If this FFR scheme us used, each cell is able to use a relatively high level for one of the regions F1 to F3. Preferably, it is allocated to a mobile station (e.g., a mobile station located on a cell boundary) having a poor channel status.

As mentioned in the foregoing description, if the FFR scheme is used, it is able to enhance communication performance of a mobile station located on a cell boundary. Yet, in order to further enhance the communication performance of the cell boundary mobile station, it is necessary to apply PMI (precoding matrix index) coordination scheme.

The PMI coordination technique is one of operation schemes for inter-cell interference coordination. The PMI coordination means a scheme of restricting a mobile station belonging to a serving cell not to use a PMI (or a beam pattern of at least one neighbor cell toward a serving cell) causing most interference with at least one neighbor cell or recommending a use of a good PMI (or a beam pattern of at least one neighbor cell non-toward a serving cell) causing least interference with at least one neighbor cell to a mobile station belonging to a serving cell.

In particular, a cell boundary mobile station is able to make a report for restricting a use of PMI causing smallest interference among PMIs used by at least one neighbor cell to a serving cell. On the contrary, the cell boundary mobile station is able to make a report for recommending a good PMI causing smallest interference among PMIs used by at least one neighbor cell to a serving cell. In this case, the good PMI causing the smallest interference among the PMIs used by the at least one neighbor cell is usable in case that a serving cell and an neighbor cell operate in joint processing mode with a mobile station by being coordinated with each other.

In a wireless communication system using a multi-cell based FFR, an FFR configuration for each cell can be set in advance. In particular, FFR configuration, which includes at least one of frequency partition allocation information for each cell, power level pattern information and a power level value per frequency partition, can be set in advance. In this case, a serving base station is able signal the preset FFT configuration to a mobile station in form of an index or the like.

In the following description, a method for a mobile station to make a report of PMI for at least one neighbor cell (or sector) to a serving cell is schematically explained.

Figure 2:
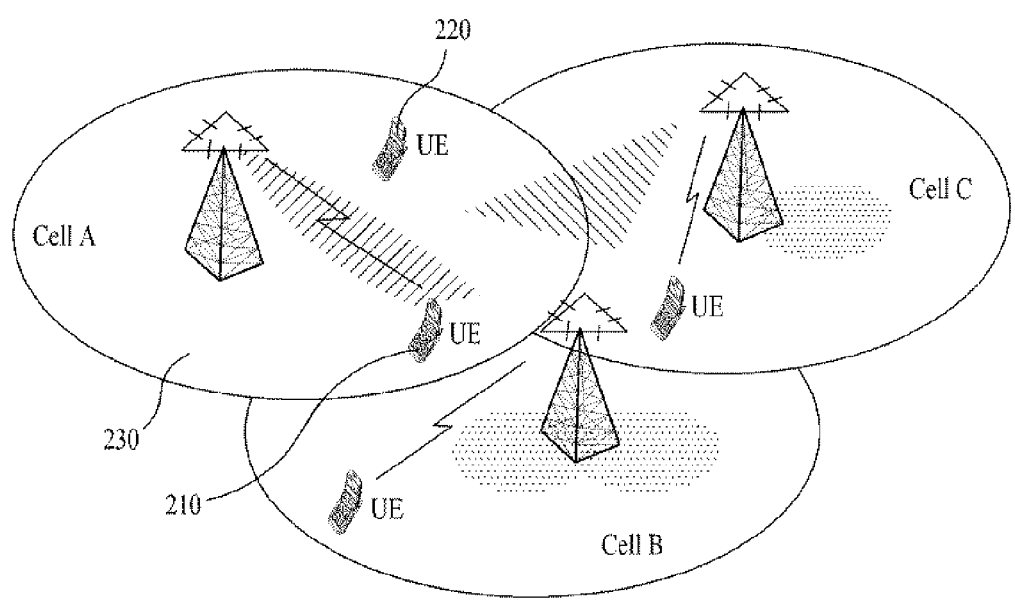
FIG. 2 is a conceptional diagram for explaining a method for a mobile station to transmit feedback information in multi-cell based environment using FFR.

FIG. 2 is a conceptional diagram for explaining a method for a mobile station to transmit feedback information in multi-cell based environment using FFR.

Referring to FIG. 2, a serving base station (cell) is able to allocate a specific frequency partition to a mobile station based on a link quality that can vary according to a (distance) geometry spaced apart from itself in general. A serving base station A is able to allocate a specific frequency partition F1 to a mobile station 210 located on a boundary of a cell A. And, the serving base station is able to direct the mobile station 210 located on the boundary of the cell A to make a report for feedback information corresponding to a region F1 (e.g., frequency partition with index 0) that is the specific frequency partition only. In this case, the feedback information reported to the serving base station by the mobile station 210 can include CQI (channel quality indicator), PMI (precoding matrix index), RANK, associated information and the like.

For instance, in case of the cell A, the serving base station is able to instruct the cell boundary mobile station 210 to report the feedback information on a whole bandwidth F1 to F4 as well as the specific frequency partition F1.

First of all, explained in the following description is the case that the serving base station instructs or requests the mobile station 210 to report feedback information on the specific frequency partition (called a resource unit, a subband or the like). In this case, according to the request or instruction made by the serving base station, the mobile station 210 is able to report PMI information used by at least one neighbor cell in the specific frequency partition to the serving base station.

In particular, the mobile station 210 is able to report the information on the PMI causing most interference among PMIs used by the at least one neighbor cell in the instructed specific frequency partition (e.g., the region F1 in the cell A) or the information on the PMI causing least interference among the PMIs used by the at least one neighbor cell to the serving base station.

Moreover, the mobile station 210 is able to further report interference strength information attributed to the PMI used by the at least one neighbor cell in the F1 region frequency partition to the serving base station in addition to the PMI information.

Optionally, the mobile station 210 is able to further report the associated information such as a carrier to interference plus noise ratio (hereinafter abbreviated CINR) variation to the serving base station.

In this case, the associated information can include strength information of interference caused by the PMI used by the at least one neighbor cell and/or CINR variation information. And, the CINR (or SINR) variation can be called improved CINR information as well. The CINR (or SINR) variation information can include the information corresponding to a difference between a CINR value (or an SINR value), which is measured in case that the at least one neighbor cell uses a good PMI causing least interference in the specific frequency partition (e.g., F1) or does not use a PMI causing most interference, and a CINR value (or an SINR value) measured prior to applying it. This CINR variation information can indicate how much a channel status of the serving cell is improved in case of not using the PMI restricting the at least one neighbor cell in the specific frequency partition or using the recommended PMI.

Thus, the mobile station 210 located on the boundary of the specific cell is able to report the information on the PMI enabling the at least one neighbor cell to cause interference, interference strength information due to the PMI used by the at least one neighbor cell, the CINR variation information in case of applying or not applying the recommended or restricted PMI to the at least one neighbor cell, etc. to the serving base station. In particular, the mobile station is able to report at least one of the information on PMI, the interference strength information and the CINR variation information to the serving base station. In doing so, the mobile station combines these informations into various forms and is then able to report the corresponding combinations to the serving base station.

Yet, a prescribed mobile station 220 located within the cell that maintains a good link quality may not report this PMI information and/or the like to the serving base station. If the PMI information and/or the like is not reported exceptionally, the mobile station 220 can be implicitly aware of this exceptional case by the explicit signaling or implicit instruction from the serving base station.

For example of the implicit instruction, the mobile station 220 can be implicitly aware based on the frequency partition information allocated to report the link quality or the feedback information. In particular, if the mobile station has a good link quality or receives allocations of the region F2 and the region F3 in the cell A, the mobile station may not report the feedback information to the serving base station.

The serving base station is able to signal a specific frequency partition which needs to report feedback information to mobile stations. Even if there is no signaling or instruction of the serving base station for the specific frequency partition for reporting the PMI information of the at least one neighbor cell, the mobile station is able to transmit information on the specific frequency partition to the serving base station together with measurement information on the PMI and/or associated information of the at least one neighbor cell in the specific frequency partition.

In the following description, explained is a case that a serving base station instructs or requests a report of feedback information on a region of a frequency reuse 1 and a region of a frequency reuse N (N>1, N is a natural number, N=3 in the following description).

First of all, mobile stations 210 and 220 allocated to a frequency reuse 1 region and frequency reuse N regions can report feedback information on at least one neighbor cell to a serving base station according to a request or instruction from the serving base station, respectively. According to the request or instruction, except the mobile station 210 having a frequency partition of the frequency reuse 1 allocated thereto, the mobile stations allocated to the entire frequency partitions corresponding to the frequency reuse N or the mobile stations allocated to some of the frequency partitions corresponding to the frequency reuse N can report PMI information on the at least one neighbor cell and/or associated information in the corresponding frequency partitions to the serving base station, respectively.

In particular, the mobile station 210 allocated to the region F1 of the frequency reuse 3 and the mobile station 220 allocated to the region F4 of the frequency reuse 1 for example can report the PMI information on the at least one neighbor cell and/or the associated information to the serving base station in the corresponding frequency partitions, respectively.

In order to help the mobile stations 210 and 220 to report the feedback information to the serving base station, the serving base station is able to signal information on the FFR configuration to the mobile stations 210 and 220. Meanwhile, without this signaling, each of the mobile stations 210 and 220 is able to know a target frequency partition (or target resource unit) to report the PMI information on the at least one neighbor cell using a pilot (or mid-amble) signal and the information associated with a power boosting level in the corresponding frequency partition.

In the following description, schematically explained are operations of a base station and a mobile station in case of considering PMI coordination using PMI information on at least one neighbor cell reported by the mobile stations 210 and 220. Generally, the serving base station is able to transmit a codebook, which is modified by reflecting the PMI coordination, to at last one adjacent base station via upper layer signaling or the like.

The PMI coordination may not apply to a mobile station allocated to a specific frequency partition. For instance, the PMI coordination may not apply to the mobile station allocated to the region F4 of the specific frequency partition in FIG. 1 and FIG. 2. This is because the region F4 will be generally allocated to inner-cell mobile stations in each cell. Therefore, the mobile station allocated to the region F$ can find a PMI to use from a preset codebook. In particular, the mobile station allocated to the region F4 can use the preset codebook for the region F4, whereas the mobile station allocated to the region F1, F2 and/or F3 is able to use a modified codebook.

In case that a serving base station instructs a mobile station to apply inter-cell inference coordination (e.g., the PMI coordination) via explicit signaling, the mobile station applies the PMI coordination or may not apply the PMI coordination according to an allocated frequency partition. For instance, the region F1, F2 or F3 is allowed to apply the PMI coordination, whereas the region F4 may not be allowed to apply the PMI coordination. Moreover, the mobile station not allowed to apply the PMI coordination may not apply the PMI coordination in a random frequency partition.

A serving base station is able to perform signaling to a mobile station to apply PMI coordination. And, the serving base station is also able to signal information on a corresponding frequency partition (e.g., whole bandwidth, specific frequency partition, or latest best subbands reported by the mobile station single BS (serving BS) MIMO) to which the PMI coordination will be applied. For instance, the mobile station 210 is just allowed to apply the PMI coordination in the region F1 via the signaling from the serving base station. On the contrary, the mobile station 220 may not apply the PMI coordination in a random frequency partition (resource unit) via signaling from the serving base station.

In FIG. 1, if the cell A is taken for example, since it is highly probable that the region F2 and/or the region F3 will be allocated to an inner cell mobile station, the mobile station allocated to the region F2 and/or the region F3 is able to use a codebook modified by the PMI coordination. Since a distance of the inner cell mobile station from the serving base station is small, there is not much difference in communication performance despite using the modified codebook. Yet, the cell boundary mobile station allocated to the region F1 and/or the inner cell mobile station allocated to the region F4 is able to use a preset codebook as it is, without applying the PMI coordination.

Based on feedback information including PMI information on at last one neighbor cell, PMI coordination can be performed. Based on this PMI coordination, a serving base station is able to modify a preset codebook. For instance, it is able to modify a codebook in a manner of restricting a PMI used by a specific neighbor cell in a specific frequency partition. The serving base station is able to inform an neighbor cell of the modified codebook via upper layer signaling or the like. And, based on the feedback information reported by a mobile station, the serving base station is able to inform at least one neighbor cell of a PMI, which is to be specifically restricted among PMIs used by an neighbor cell in a specific frequency partition, or PMI information, which is to be specifically recommended, via upper layer signaling or the like.

If so, the adjacent base station (cell) having received the restricted or recommended PMI information does not use the restricted PMI or can use the recommended PMI. Moreover, the adjacent base station having received the modified codebook information is able to inform mobile station within its cell of the modified codebook information via a specific message (e.g., AAI_DL_IM message). In this case, the mobile stations can be informed of FFR configuration information including frequency partition information together with the modified codebook information. Moreover, the mobile station allocated per frequency partition can be informed of the modified codebook information that is to be used in each frequency partition.

If the above-described PMI coordination process is performed, average cell throughput can be considerably improved as well as throughput of a cell boundary user.

In the following description, a mobile station apparatus using a feedback information transceiving method according to the present invention and a base station apparatus using the same are schematically explained.

Figure 3:
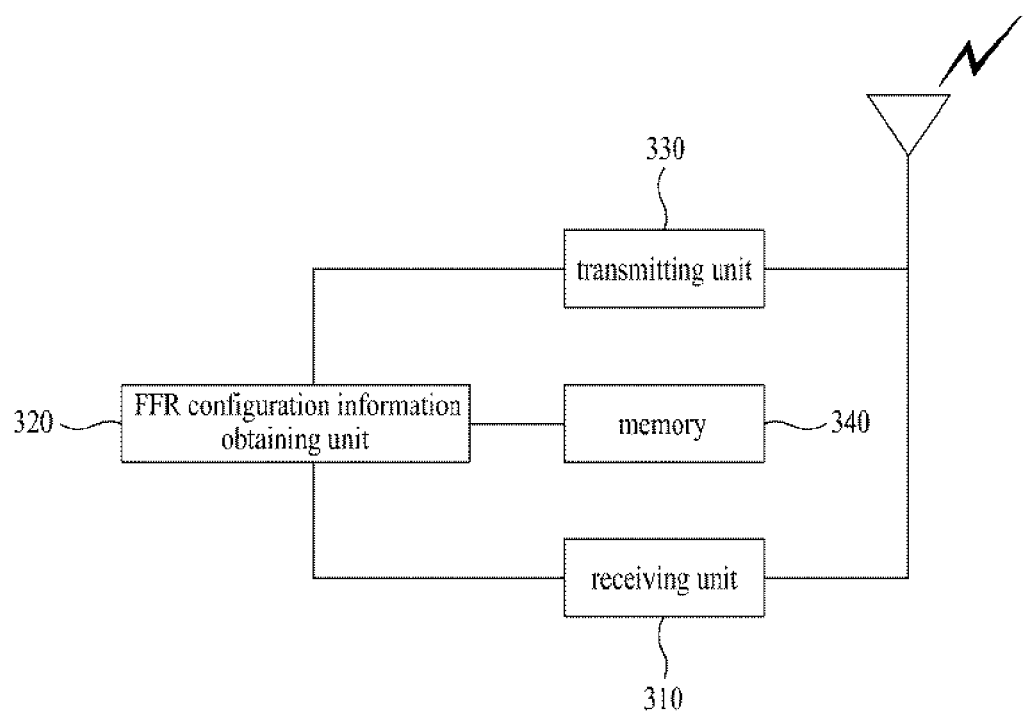
FIG. 3 is a block diagram for configuration of a mobile station apparatus for transmitting feedback information according to a preferred embodiment of the present invention.

FIG. 3 is a block diagram for configuration of a mobile station apparatus for transmitting feedback information according to a preferred embodiment of the present invention.

Referring to FIG. 3, a mobile station apparatus can include a receiving unit 310, a FFR configuration information obtaining unit 320, a transmitting unit 330 and a memory 340.

The receiving unit 310 is able to receive various signals, information and data inputted from such an outside as a serving base station and the like. The receiving unit 310 may receive a target resource unit information for feedback and inter-cell interference coordination type information indicating operation type of the inter-cell interference coordination from a serving base station (BS).

The FFR configuration information obtaining unit 320 is able to obtain FFR configuration information including configuration information on at least one frequency partition to which FFR scheme corresponding per cell ID is applied.

The transmitting unit 330 may transmit feedback information having a type corresponding to the inter-cell interference coordination type for resource unit corresponding to the target resource unit information to the serving BS. Also, the transmitting unit 330 is able to transmit PMI information, which is to be specifically restricted or recommended among precoding matrix indexes (PMIs) used by at least one neighbor cell in a specific frequency partition (frequency partition with index 0) having a mobile station applied thereto, power boosted frequency partition, or whole bandwidth, to the serving base station.

The memory 340 is able to store data operated within the mobile station apparatus for a prescribed period of time as well as externally received information and data. And, the memory 340 can be replaced by such a component as a buffer (not shown in the drawing) and the like.

Figure 4:
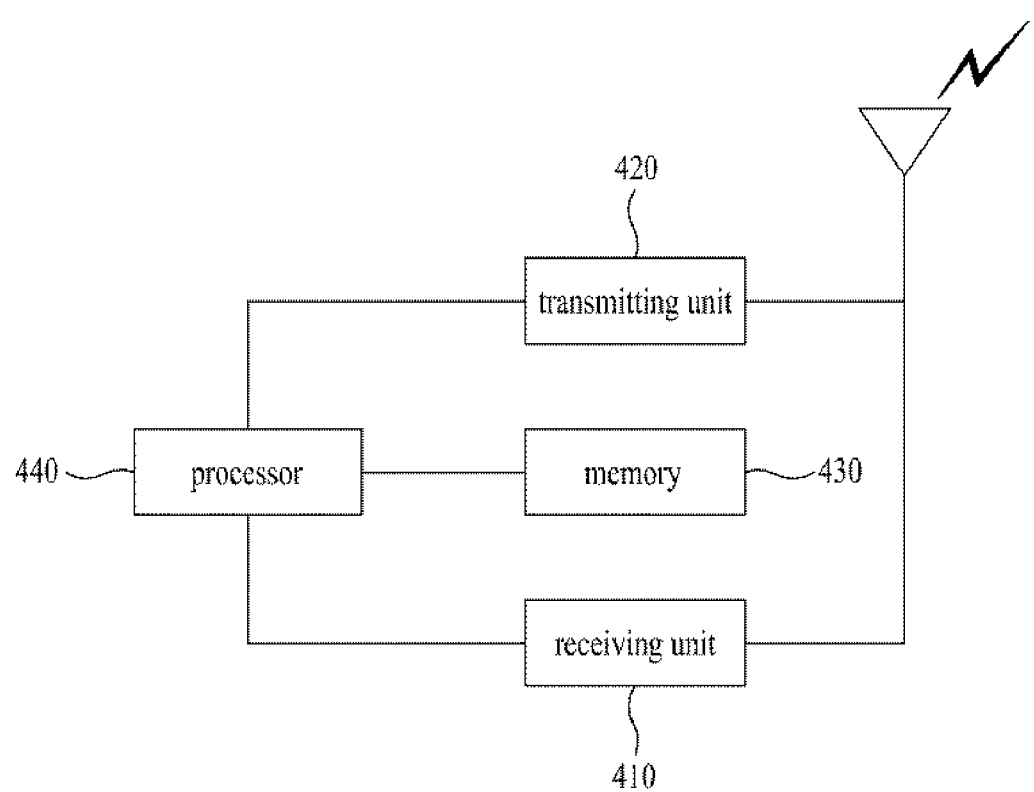
FIG. 4 is a block diagram for configuration of a base station apparatus for receiving feedback information according to a preferred embodiment of the present invention.

FIG. 4 is a block diagram for configuration of a base station apparatus for receiving feedback information according to a preferred embodiment of the present invention.

Referring to FIG. 4, a base station apparatus can include a receiving unit 410, a transmitting unit 420, a memory 430 and a processor 440.

The receiving unit 410 may receive feedback information having a type corresponding to the inter-cell interference coordination type for resource unit corresponding to the target resource unit information from a MS. The receiving unit 410 is able to receive PMI information, which is to be specifically restricted or recommended among precoding matrixes (PMIs) used by at least one neighbor cell in a specific frequency partition among types of the inter-cell inference coordination from a specific mobile station. And, the receiving unit 410 is able to receive a signal strength/interference level gain value, which corresponds to a difference between signal strength/interference level calculated by applying the PMI information for the at least one neighbor cell in a specific partition and a signal strength/interference level calculated in case of not applying the PMI set information, from a specific mobile station. And, the receiving unit 410 is able to receive interference level information attributed to the PMI used by the at least one neighbor cell in the specific partition from the specific mobile station.

The transmitting unit 420 may transmits a target resource unit information for feedback and inter-cell interference coordination type information indicating operation type of the inter-cell interference coordination to a mobile station (MS). And the transmitting unit 420 is able to transmit the PMI information received by the receiving unit 410 from the mobile station to the at least one neighbor cell.

The memory 430 is able to store data operated within the base station apparatus for a prescribed period of time as well as externally received information and data. And, the memory 430 can be replaced by such a component as a buffer (not shown in the drawing) and the like.

And, the processor 440 is able to perform operation processing using the externally received information and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

What is claimed is:

1. A method of transmitting feedback information in a multi-cell wireless communication system using fractional frequency reuse (FFR), the method comprising:
   receiving a polling message from a serving base station (BS), wherein the polling message comprises a target resource unit (TRU) information and interference coordination type (ICT) information, wherein the TRU information indicates frequency resource units for feedback measurements; and
   transmitting feedback information to the serving BS in response to the polling message, wherein the feedback information comprises channel measurements measured in accordance with the ICT information and in accordance with the frequency resource units indicated by the TRU information,
   wherein the ICT information indicates whether precoding matrix index (PMI) restriction information or PMI recommendation information is to be reported for one or more neighbor cells.

2. The method of claim 1, wherein the TRU information indicates any one of whole bandwidth, a FFR partition 0, and power boosted FFR partition.

3. The method of claim 1, wherein the TRU information indicates either a whole bandwidth or a FFR partition.

4. The method of claim 1, wherein when the ICT information indicates the PMI restriction information is to be reported, the PMI restriction information is a PMI that causes strongest interference among PMIs used by at least one neighboring cell in the frequency resource units indicated by the TRU information.

5. The method of claim 1, wherein when the ICT information indicates the PMI recommendation information is to be reported, the PMI recommendation information is a PMI that causes weakest interference among PMIs used by a neighboring cell operating in the particular frequency range indicated in the TRU information.

6. The method of claim 1, wherein the channel measurements included in the feedback information comprise at least a channel quality indicator (CQI), a PMI, a signal to interference plus noise ratio (SINR), or a carrier to interference plus noise ratio (CINR).

7. A mobile station (MS) for transmitting feedback information in a multi-cell wireless communication system using fractional frequency reuse (FFR), the mobile station comprising:
   a receiver for receiving a polling message from a serving base station (BS), wherein the polling message comprises a target resource unit (TRU) information and interference coordination type (ICT) information, wherein the TRU information indicates frequency resource units for feedback measurements; and
   a transmitter for transmitting feedback information to the serving BS in response to the polling message, wherein the feedback information comprises channel measurements measured in accordance with the ICT information and in accordance with the frequency resource units indicated by the TRU information,
   wherein the ICT information indicates whether precoding matrix index (PMI) restriction information or PMI recommendation information is to be reported for one or more neighbor cells.

8. The mobile station of claim 7, wherein the TRU information indicates any one of whole bandwidth, a FFR partition 0, and power boosted FFR partition.

9. The mobile station of claim 7, wherein the TRU information indicates either a whole bandwidth or a frequency partition.

10. The mobile station of claim 7, wherein when the ICT information indicates the PMI restriction information is to be reported, the PMI restriction information is a PMI that causes strongest interference among PMIs used by at least one neighboring cell in the frequency resource units indicated by the TRU information.

11. The mobile station of claim 7, wherein when the ICT information indicates the PMI recommendation information is to be reported, the PMI recommendation information is a PMI that causes weakest interference among PMIs used by a neighboring cell operating in the particular frequency range indicated in the TRU information.

12. The mobile station of claim 7, wherein the channel measurements included in the feedback information comprise at least a channel quality indicator (CQI), a PMI, a signal to interference plus noise ratio (SINR), or a carrier to interference plus noise ratio (CINR).

13. A method of receiving feedback information at a base station (BS) in a multi-cell wireless communication system using fractional frequency reuse (FFR), the method comprising:
   transmitting a polling message to a mobile station (MS), wherein the polling message comprises a target resource unit (TRU) information and interference coordination type (ICT) information, wherein the TRU information indicates frequency resource units for feedback measurements; and
   receiving feedback information from the MS, the feedback information being in response to the polling message, wherein the feedback information comprises channel measurements measured in accordance with the ICT information and in accordance with the frequency resource units indicated by the TRU information,
   wherein the ICT information indicates whether precoding matrix index (PMI) restriction information or PMI recommendation information is to be reported for one or more neighbor cells.

14. The method of claim 13, wherein the TRU information indicates any one of whole bandwidth, a FFR partition 0, and power boosted FFR partition.

15. The method of claim 13, wherein the TRU information indicates either a whole bandwidth or a FFR partition.

16. The method of claim 13, wherein when the ICT information indicates the PMI restriction information is to be reported, the PMI restriction information is a PMI that causes strongest interference among PMIs used by at least one neighboring cell in the frequency resource units indicated by the TRU information.

17. The method of claim 13, wherein when the ICT information indicates the PMI recommendation information is to be reported, the PMI recommendation information is a PMI that causes weakest interference among PMIs used by a neighboring cell operating in the particular frequency range indicated in the TRU information.

18. The method of claim 13, wherein the channel measurements included in the feedback information comprise at least a channel quality indicator (CQI), a PMI, a signal to interference plus noise ratio (SINR), or a carrier to interference plus noise ratio (CINR).

19. A base station (BS) for receiving feedback information in a multi-cell wireless communication system using fractional frequency reuse (FFR), the BS comprising:
    a transmitter for transmitting a polling message to a mobile station (MS), wherein the polling message comprises a target resource unit (TRU) information and interference coordination type (ICT) information, wherein the TRU information indicates frequency resource units for feedback measurements; and
    a receiver for receiving feedback information from the MS, the feedback information being in response to the polling message, wherein the feedback information comprises channel measurements measured in accordance with the ICT information and in accordance with the frequency resource units indicated by the TRU information,
    wherein the ICT information indicates whether precoding matrix index (PMI) restriction information or PMI recommendation information is to be reported for one or more neighbor cells.

20. The base station of claim 19, wherein the TRU information indicates any one of whole bandwidth, a FFR partition 0, and power boosted FFR partition.

21. The base station of claim 19, wherein the TRU information indicates either a whole bandwidth or a FFR partition.

22. The base station of claim 19, wherein when the ICT information indicates the PMI restriction information is to be reported, the PMI restriction information is a PMI that causes strongest interference among PMIs used by at least one neighboring cell in the frequency resource units indicated by the TRU information.

23. The base station of claim 19, wherein when the ICT information indicates the PMI recommendation information is to be reported, the PMI recommendation information is a PMI that causes weakest interference among PMIs used by a neighboring cell operating in the particular frequency range indicated in the TRU information.

24. The base station of claim 19, wherein the channel measurements included in the feedback information comprise at least a channel quality indicator (CQI), a PMI, a signal to interference plus noise ratio (SINR), or a carrier to interference plus noise ratio (CINR).

* * * * *